United States Patent [19]

Butler et al.

[11] Patent Number: 4,742,134

[45] Date of Patent: May 3, 1988

[54] METHOD OF ENHANCING POLYMERIZATION OF DIALKYLDIALLYL AMMONIUM COMPOUNDS TO PRODUCE HIGH MOLECULAR WEIGHT POLYMERS

[75] Inventors: George B. Butler; Huey Pledger, Jr., both of Gainesville, Fla.

[73] Assignee: University of Florida, Gainesville, Fla.

[21] Appl. No.: 921,697

[22] Filed: Oct. 22, 1986

[51] Int. Cl.$^4$ .................... C08F 2/18; C08F 126/02
[52] U.S. Cl. ............................... 526/238; 526/236; 526/295
[58] Field of Search ............... 526/238, 237, 236

[56] References Cited

U.S. PATENT DOCUMENTS 4,024,040  5/1977  Phalangas ........................ 526/312
4,376,850  3/1983  Sanner ............................. 526/196

Primary Examiner—Christopher Henderson
Attorney, Agent, or Firm—Dennis P. Clarke

[57] ABSTRACT

An improved method for preparing a polymer of a dialkyldiallyl ammonium compound comprising effecting polymerization in the presence of a free radical initiator and sufficient fluoride ion to increase the molecular weight of the polymer and accelerate the rate of polymerization.

7 Claims, 1 Drawing Sheet

METHOD OF ENHANCING POLYMERIZATION OF DIALKYLDIALLYL AMMONIUM COMPOUNDS TO PRODUCE HIGH MOLECULAR WEIGHT POLYMERS

BACKGROUND OF THE INVENTION

1. Field of the Invention

The present invention relates to the polymerization of dialkyldiallyl ammonium compounds.

2. Prior Art

Polymers of dialkyldiallyl ammonium compounds have a wide variety of uses. The cationic polymers, for example, can be used as flocculants in water and sewage treatment systems, etc.

Methods for polymerizing dialkyldiallyl ammonium compounds are well known in the prior art. See, for example, the disclosure of U.S. Pat. Nos. 2,926,161; 2,982,749; 3,288,770; 3,461,163 and 4,092,467. Generally, polymerization is effected in an aqueous reaction medium containing a free radical initiator.

It has been shown that the higher the molecular weight of the resulting cationic polymer, the more effective the polymer is as a flocculating agent.

It is an object of the present invention to provide an improved method for polymerizing dialkyldiallyl ammonium compounds whereby the rate of polymerization is accelerated and the molecular weight of the resulting polymer is increased.

SUMMARY OF THE INVENTION

The above and other objects are realized by the present invention which provides an improved method for preparing polymers of dialkyldiallyl ammonium compounds wherein polymerization is effected in the presence of a free radical initiator for the polymerization; the improvement comprising effecting the polymerization in the presence of an amount of fluoride ion sufficient to accelerate the rate of polymerization and to increase the molecular weight of the resulting polymer.

DETAILED DESCRIPTION OF THE INVENTION

U.S. Pat. No. 4,151,702 discloses a method which involves polymerization of diallyldimethyl ammonium chloride in a solution containing "a large amount of an alkali metal halide salt". Actually, the patent discloses that the alkali metal halide salt which is present in the monomer solution is a by-product produced in a preceding step of preparing the monomer. The patent states at column 4, lines 29-35:

"... Since the polymerization step of the invention can be carried out with the salt present, there is no need to remove this salt; and preferably, it is left in the final monomer solution. This eliminates a costly and time consuming filtration step, and we have found surprisingly that the alkali metal halide salt does not interfere with the polymerization of the (monomer) ..."

Thus, the patent does not disclose adding an alkali metal halide salt to the reaction medium to achieve a beneficial result. Rather, it is merely disclosed that the by-product halide from a prior manufacturing step may simply be left in the solution and a costly removal step averted because the salt "does not interfere with the polymerization." The patent does not disclose that the presence of the halide increases the rate of polymerization or the molecular weight of the resulting polymer.

Nor is it surprising that the patent does not disclose such benefits since only the fluoride ion produces these results, and it is obvious from the disclosure of U.S. Pat. No. 4,151,202 that, although disclosing "halides", only the chloride was actually employed. It will be apparent from the examples herein that the presence of fluoride ion, as opposed to other halides, is critical to the success of the invention.

East German Pat. No. 141,029 [Chem. Abs., 94, 1222734c (1981)] discloses polymerizing dialkyldiallyl ammonium compounds in the presence of "persulfates and chlorides". Again, the use of fluorides is not disclosed and there is no indication in the patent that the presence of these materials enhances the rate of polymerization and/or increases the molecular weight of the polymer produced.

Indeed, the present invention contemplates the polymerization, in the presence of fluoride ion, of dialkyldiallyl ammonium compounds in solutions containing chloride ion which is an impurity or by-product often associated with the monomers as a result of the methods conventionally employed for their production.

It is preferred to conduct the polymerization in the absence of oxygen which may be removed from the reaction medium by purging the latter with an inert gas such as nitrogen or argon. The polymerization can then be conducted under a blanket of the inert gas.

Although the invention is applicable to the polymerization of any dialkyldiallyl ammonium compound, it is particularly applicable for the polymerization of the halides, most preferably the chlorides. It is particularly preferred to utilize the method of the invention for the polymerization of diallyldimethyl ammonium chloride (DADMAC).

Preferably, the temperature of the reaction is maintained at between about 30° and about 80° C., most preferably between about 30° and about 70° C. The reaction medium is preferably aqueous to ensure maximum solubility of the reactants.

The reaction medium should contain from about 10% to about 70%, preferably from about 20% to about 60%, by weight, of the monomer and from about 0.04 mole $1^{-1}$ to about 2.30 mole $1^{-1}$ of fluoride ion. The latter may be supplied in the form of a salt with any cation which does not adversely affect the progress of the polymerization reaction and is at least partially soluble in the reaction medium. Suitable such salts include alkali metal, quaternary ammonium and certain alkaline earth metal fluorides, amine hydrofluorides, etc, e.g., sodium, potassium, lithium, cesium and ammonium fluorides; tetramethylammonium and trimethylammonium fluorides; beryllium fluoride, etc.

The polymerization can be initiated by any free radical initiator known to be effective for the polymerization of dialkydiallyl ammonium compounds. Suitable such initiators include peroxysulfates, peroxyphosphates, peroxycarbonates, alkyl peroxides, acyl peroxides, hydroperoxides, ketone peroxides, peresters, azo compounds, azides, etc., e.g., diethyl peroxydicarbonate, ammonium persulfate, potassium persulfate, potassium peroxyphosphate, t-butyl peroxide, acetyl peroxide, t-butyl hydroperoxide, methyl ethyl ketone peroxide, dimethylperoxalate, azo-bis(isobutyronitrile), benzenesulfonylazide, 2-cyano-2-propyl-azo-formamide, azo-bisisobutyramidine dihydrochloride (or as free base), azobis-(N,N'-dimethyleneisobutyramidine-dihydrochloride (or as free base), 4,4'-azo-bis(4-cyanopentanoic acid), etc.

The variables: monomer concentration, reaction time, initiator concentration, fluoride ion concentration and reaction temperature all combine to affect the rate of polymerization and molecular weight of the polymer. Those skilled in the art, being aware of the principles of the present invention as disclosed herein, will be capable of selecting the exact values of these parameters to achieve particular desired results without undue experimentation.

After polymerization, the polymer may be recovered, i.e., removed from the reactor and handled as necessary. It may be diluted with water and used as such, or the polymer can be isolated by the usual procedures of isolating polymers. The polymer will usually contain both chloride and fluoride as counterions. The ratio of these two anions will depend on the initial ratio of the anions after $F^-$ is added. The polymer can be converted to a desired salt form by either ion exchange (U.S. Pat. No. 3,288,770), dialysis, or ultrafiltration.

Figure 1:
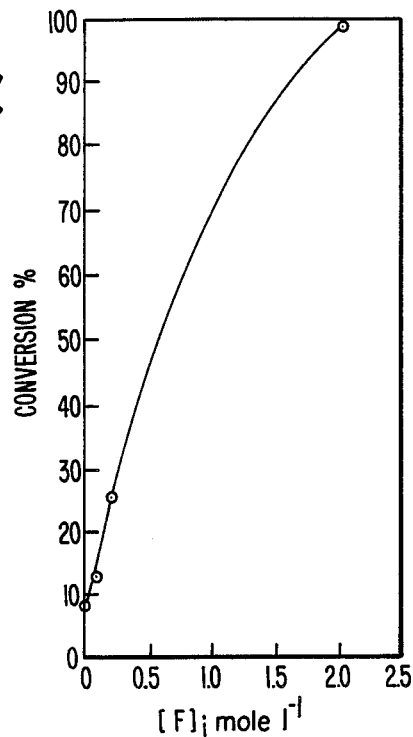
FIG. 1 illustrates how conversion increases as $F^-$ concentration is increased from zero to 1.03 mole $1^{-1}$ when the polymerization was conducted at 60° C. for 48 hours, all reaction conditions remaining constant.

This invention is fully illustrated by the following non-limiting examples.

EXAMPLE 1

To a 50 ml Erlenmeyer flask containing 0.09018 g $(3.956 \times 10^{-4}$ mole) of $(NH_4)_2S_2O_8$ was added 25.0 ml of an aqueous solution of DADMAC which had been flushed with and stored under $N_2$. This aqueous DADMAC solution contained 12.78 g $(7.910 \times 10^{-2}$ mole) of DADMAC. After flushing the solution an additional 15 minutes with $N_2$, the flask was closed with a serum cap and placed in an oven at 60° C. for 48 hours. After this period of time, the viscous reaction mixture was diluted to 100 ml with deionized water, and the homogeneous solution analyzed for percent conversion of monomer and MW of polymer. Conversion was found to be 32.6%, and polymer MW was 53.5 counts. (The smaller the numerical value of counts, the higher the MW.)

The above experiment was repeated with the sole exception being that 4.60 g of KF 2H$_2$O was added. The conversion increased to 57.2%, and polymer MW increased to 44.0 counts.

EXAMPLE 2

This example, carried out as in Example 1, illustrates the effect of $F^-$ concentration on conversion and MW when $[DADMAC]_i = 2.79$ mole $1^{-1}$, $[S_2O_8^=]_i = 182 \times 10^{-2}$ mole $1^{-1}$, reaction time = 72 hours, reaction temperature = 50° C., and $[F^-]_i$ was increased from 0.043 mole $1^{-1}$ to 1.13 mole $1^{-1}$. Conversion increased from 12.5% to 56.3%. Molecular weight of the polymer increased from 58.4 counts to 55.6 counts. Conversion at zero concentration of $F^-$ was 10.8%.

EXAMPLE 3

Figure 2:
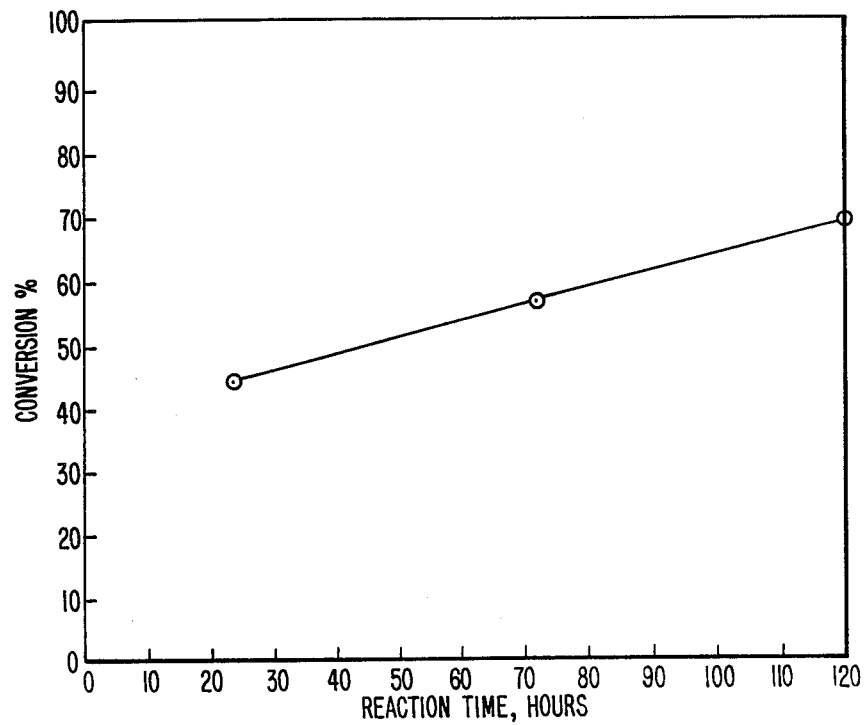
FIG. 2 illustrates the effect of reaction time on monomer (DADMAC) conversion and the molecular weight of polymer at constant reaction temperature and concentrations of reactants and additions.

The example illustrates the effect of reaction time on monomer conversion and polymer MW when reaction temperature and concentrations are kept constant: $[DADMAC]_i = 2.79$ mole $1^{-1}$; $[S_2O_8^=]_i = 1.83 \times 10^{-2}$ mole $1^{-1}$; $[F^-]_i = 1.13$ mole $1^{-1}$; Temp. = 50° C. Time was varied from 24 to 120 hours. FIG. 2 illustrates how conversion changes with time. The MW of the three polymers was the same, 55.6 0.5 counts.

EXAMPLE 4

In order to effectively demonstrate that fluoride ion catalyzes the polymerization of diallyldimethyl ammonium chloride to increase the rate of polymerization and to produce polymer of higher molecular weight, a central composite experimental design approach was chosen and limits for its effectiveness established.

Central Composite Designs (CCD) are experimental designs which allow the prediction of the effects of varying up to five variables simultaneously on conversions and molecular weight ($M_w$) by carrying out about 27 experiments instead of hundreds or thousands of experiments. The data from the 27 experiments can be subjected to linear regression and conical analyses by computer to obtain two equations which relate conversion and $M_w$ to the variables.

The five variables which would be expected to affect monomer conversions and molecular weight of poly(diallyldimethylammonium chloride) are monomer, initiator, and fluoride ion concentrations, reaction time and reaction temperature. To study the effect of any one variable it would be required to hold the other four constant. If 5 values of each variable were used a total of 3125 experiments would be required (a $5^5$ factorial design). Even then one could not predict the effect of varying two, three, four or all five of the variables simultaneously unless one assumed no interaction between the variables, which is rarely the case.

If in the conversion, y, is a function of the five variables $X_1$, monomer concentration, $X_2$, initiator concentration, $X_3$, fluoride ion concentration, $X_4$ reaction time, and $X_5$, reaction temperature, one can attempt to reduce the number of experiments from 3125 to 27 by utilizing a "second-order" central composite design. Generally two duplicate experiments are run making the total = 27. The general equation for a four-variable design is shown as Equation 1 where $B_O$ is the value of conversion at the intercept $B_1$, $B_2$, $B_{12}$, $B_{11}$, etc. are coefficients of the linear, cross-products, and quadratic terms of the variables. The variables can be coded as $C_1$, $C_2$, $C_3$, $C_4$ and would be related to $X_1$, $X_2$, $X_3$, $X_4$ by equations which can readily be derived.

$$Y = B_0 + B_1C_1 + B_2C_2 + B_3C_3 + B_4C_4 + B_{12}C_1C_2 + B_{13}C_1C_3 + B_{14}C_1C_4 + B_{23}C_2C_3 + B_{24}C_2C_4 + B_{34}C_3C_4 + B_{11}C_1^2 + B_{22}C_2^2 + B_{33}C_3^2 + B_{44}C_4^2 \qquad 1.$$

Equation 1 represents a curved surface which can take one of several forms such as a saddle surface, a saucer surface, a rising ridged surface, etc. The quadratic terms cause a curvature in an otherwise planar surface. If the best fit to the data is an equation lacking quadratic terms then the surface would be planar.

Computer programs are available which will calculate the values of the intercept and coefficients. They will also determine the probabilities for rejection of each term and the linear, cross-product, and quadratic terms as a group.

The data and results of 27 experiments (see Table 1) were subjected to linear regression by computer. The equation (Eq. II) generated by the computer which relates conversion to five independent variables: reaction temperature ($X_5$), reaction time ($X_4$), fluoride ion concentration ($X_3$), ammonium persulfate concentration ($X_2$), and monomer concentration ($X_1$) is:

$$Y = \% \text{ Conversion} = \qquad \text{II.}$$
$$-49.5\% + [4.40X_1 - 901X_2 + 48.9X_3 + 0.935X_4 +$$
$$2.02X_5 + 744X_1X_2 - 10.7X_1X_3 - 0.332X_1X_4 + 0.156X_1X_5 -$$
$$306X_2X_3 - 6.13X_2X_4 - 7.87X_2X_5 + 0.172X_3X_4 - 0.211X_3X_5 -$$
$$0.00419X_4X_5 + 3.51X_1^2 + 903X_2^2 - 0.266X_3^2 +$$
$$0.02244X_4^2 - 0.015X_5^2]\%.$$

This equation shows that the fluoride ion catalyzes the polymerization of DADMAC, and increases the rate of polymerization with the result that higher conversions are obtained.

A series of six experiments (see Table 2) showed that without fluoride ion, conversions were 38.6, 55.0 and 62.1% whereas the same experiments with fluoride ion present resulted in conversions of 86.2, 83.8, and 70.0%, respectively.

The 27 experiments were conducted within the following boundary values:

$X_1 = 1.87 = 3.71$ mole $l^{-1}$ $\qquad X_4 = 24-120$ hours $X_2 = (4.1 - 32.5) \times 10^{-3}$ mole $l^{-1}$ $\qquad X_5 = 30-70°$ C.

$X_3 = 0.04 - 2.31$ mole $l^{-1}$

The $\overline{M}_w$ of the polyDADMAC produced in the 27 experiments ranged between 135,000 and 528,000. The further effect of KF on $\overline{M}_w$ was shown in the six comparative experiments wheren $\overline{M}_w=2.43\times10^5$, $1.81\times10^5$, and $1.57\times10^5$ with KF and $1.42\times10^5$, $1.73\times10^5$, and $1.12\times10^5$ respectively without KF. The computer generated equation (Eq. III) relating the five independent variables $X_1$, $X_2$, $X_3$, $X_4$, and $X_5$ to $M_w$ is:

$$M_w = -3.91 \times 10^5 + \qquad \text{III.}$$
$$(3.37X_1 - 344X_2 + 4.52X_3 + 0.0359X_4 +$$
$$0.00892X_5 + 4.95X_1X_2 - 1.17X_1X_3 - 0.00917X_1X_4 -$$
$$0.0334X_1X_5 - 29.5X_2X_3 + 0.125X_2X_4 + 0.194X_2X_5 -$$
$$0.00106X_3X_4 - 0.0114X_3X_5 - 0.000489X_4X_5 + 0.126X_1^2 +$$
$$7347X_2^2 + 0.0689X_3^2 + 0.000150X_4^2 + 0.00102X_5^2) \times 10^5.$$

This equation shows that fluoride ion catalyzes polymerization of DADMAC to polymer of higher molecular weight than obtained in its absence.

TABLE 1

The Fluorine Ion Catalyzed Polymerization of Diallyldimethylammonium Chloride (DADMAC)

| Expt. # | DADMAC g | DADMAC mole $l^{-1}$ | Code | $(NH_4)_2S_2O_8$ mole $l^{-1} \times 10^3$ | Code | $KF \cdot 2H_2O$ mole $l^{-1}$ | Code | Time Hrs. | Code | Temp. °C. | Code | % Conversion | $M_w \times 10^{-5}$ |
|---|---|---|---|---|---|---|---|---|---|---|---|---|---|
| 4 | 5.25 | 3.25 | 1 | 25.4 | 1 | 0.54 | −1 | 96 | 1 | 60 | 1 | 96.8 | 2.31 |
| 19 | 5.25 | 3.25 | 1 | 25.4 | 1 | 1.72 | 1 | 96 | 1 | 40 | −1 | 90.5 | 2.55 |
| 2A | 5.25 | 3.25 | 1 | 25.4 | 1 | 1.72 | 1 | 48 | −1 | 60 | 1 | 98.9 | 1.49 |
| 21 | 5.25 | 3.25 | 1 | 25.4 | 1 | 0.54 | −1 | 48 | −1 | 40 | −1 | 99.0 | 2.55 |
| 3 | 5.25 | 3.25 | 1 | 11.2 | −1 | 1.72 | 1 | 96 | 1 | 60 | 1 | 86.5 | 2.10 |
| 22 | 5.25 | 3.25 | 1 | 11.2 | −1 | 0.54 | −1 | 96 | 1 | 40 | −1 | 82.3 | 3.25 |
| 5 | 5.25 | 3.25 | 1 | 11.2 | −1 | 0.54 | −1 | 48 | −1 | 60 | 1 | 94.7 | 2.43 |
| 20 | 5.25 | 3.25 | 1 | 11.2 | −1 | 1.72 | 1 | 48 | −1 | 40 | −1 | 86.3 | 2.81 |
| 6 | 3.76 | 2.33 | −1 | 25.4 | 1 | 1.72 | 1 | 96 | 1 | 60 | 1 | 89.1 | 2.10 |
| 26 | 3.76 | 2.33 | −1 | 25.4 | 1 | 0.54 | −1 | 96 | 1 | 40 | −1 | 83.5 | 1.81 |
| 8 | 3.76 | 2.33 | −1 | 25.4 | 1 | 0.54 | −1 | 48 | −1 | 60 | 1 | 80.3 | 1.17 |
| 23 | 3.76 | 2.33 | −1 | 25.4 | 1 | 1.72 | 1 | 48 | −1 | 40 | −1 | 83.5 | 1.65 |
| 9 | 3.76 | 2.33 | −1 | 11.2 | −1 | 0.54 | −1 | 96 | 1 | 60 | 1 | 86.2 | 1.81 |
| 24 | 3.76 | 2.33 | −1 | 11.2 | −1 | 1.72 | 1 | 96 | 1 | 40 | −1 | 97.3 | 3.25 |
| 7 | 3.76 | 2.33 | −1 | 11.2 | −1 | 1.72 | 1 | 48 | −1 | 60 | 1 | 86.2 | 2.43 |
| 25 | 3.76 | 2.33 | −1 | 11.2 | −1 | 0.54 | −1 | 48 | −1 | 40 | −1 | 70.2 | 1.17 |
| 10 | 5.99 | 3.71 | 2 | 18.3 | 0 | 1.13 | 0 | 72 | 0 | 50 | 0 | 97.3 | 2.31 |
| 18 | 3.02 | 1.87 | −2 | 18.3 | 0 | 1.13 | 0 | 72 | 0 | 50 | 0 | 74.8 | 1.57 |
| 12 | 4.51 | 2.79 | 0 | 32.5 | 2 | 1.13 | 0 | 72 | 0 | 50 | 0 | 90.9 | 1.35 |
| 16 | 4.51 | 2.79 | 0 | 4.1 | −2 | 1.13 | 0 | 72 | 0 | 50 | 0 | 78.9 | 5.28 |
| 13 | 4.51 | 2.79 | 0 | 18.3 | 0 | 1.13 | 0 | 120 | 2 | 50 | 0 | 93.6 | 2.55 |
| 15 | 4.51 | 2.79 | 0 | 18.3 | 0 | 1.13 | 0 | 24 | −2 | 50 | 0 | 83.8 | 1.81 |
| 1 | 4.51 | 2.79 | 0 | 18.3 | 0 | 1.13 | 0 | 72 | 0 | 70 | 2 | 83.8 | 1.35 |
| 27 | 4.51 | 2.79 | 0 | 18.3 | 0 | 1.13 | 0 | 72 | 0 | 30 | −2 | 70.0 | 3.25 |
| 14 | 4.51 | 2.79 | 0 | 18.3 | 0 | 1.13 | 0 | 72 | 0 | 50 | 0 | 86.5 | 1.65 |
| 14-1 | 4.51 | 2.79 | 0 | 18.3 | 0 | 1.13 | 0 | 72 | 0 | 50 | 0 | 86.5 | 1.65 |
| 14-2 | 4.51 | 2.79 | 0 | 18.3 | 0 | 1.13 | 0 | 72 | 0 | 50 | 0 | 90.9 | 1.49 |
| 11 | 4.51 | 2.79 | 0 | 18.3 | 0 | 2.31 | 2 | 72 | 0 | 50 | 0 | 88.7 | 2.31 |
| 17 | 4.51 | 2.79 | 0 | 18.3 | 0 | 0.04 | −2 | 72 | 0 | 50 | 0 | 76.3 | 1.57 |
| P-N-1 | 4.51 | 2.79 | 0 | 18.3 | 0 | none | | 72 | 0 | 30 | −2 | 62.1 | 1.12 |
| P-N-2 | 4.51 | 2.79 | 0 | 18.3 | 0 | none | | 24 | −2 | 50 | 0 | 55.0 | 1.73 |
| P-N-3 | 3.76 | 2.33 | −1 | 11.2 | −1 | none | | 48 | −1 | 60 | 1 | 38.6 | 1.42 |

TABLE 2

Selected Pairs of Experimental Results Which Show the Effect of Fluoride Ion on Increasing Both Conversion and Molecular Weight of Polydimethylammonium Chloride (Poly-DADMAC)

| Expt. # | DADMAC g | DADMAC mole $l^{-1}$ | Code | $(NH_4)_2S_2O_8$ mole $l^{-1}$ × $10^3$ | Code | $KF2H_2O$ mole $l^{-1}$ | Code | Time Hrs. | Code | Temp °C. | Code | % Conversion | $M_w$ × $10^{-5}$ |
|---|---|---|---|---|---|---|---|---|---|---|---|---|---|
| P-N-2 | 4.51 | 2.79 | 0 | 18.3 | 0 | none | | 24 | −2 | 50 | 0 | 55.0 | 1.73 |
| 15 | 4.51 | 2.79 | 0 | 18.3 | 0 | 1.13 | 0 | 24 | −1 | 50 | 0 | 83.8 | 1.81 |
| P-N-3 | 3.76 | 2.33 | −1 | 11.2 | −1 | none | | 48 | −1 | 60 | 1 | 38.6 | 1.42 |
| 7 | 3.76 | 2.33 | −1 | 11.2 | −1 | 1.72 | 1 | 48 | −1 | 60 | 1 | 86.2 | 2.43 |
| P-N-1 | 4.51 | 2.79 | 0 | 18.3 | 0 | none | | 72 | 0 | 30 | −2 | 62.1 | 1.12 |
| 27 | 4.51 | 2.79 | 0 | 18.3 | 0 | 1.13 | 0 | 72 | 0 | 30 | −2 | 70.0 | 3.25 |

We claim:

1. In a method for preparing a polymer of a dialkyldiallyl ammonium compound comprising effecting polymerization thereof in an aqueous reaction medium in the presence of a free radical initiator for said polymerization, the improvement comprising effecting said polymerization in the presence of from about 0.04 mole $l^-$ to about 1.30 $l^-$ of fluoride ion to accelerate the rate of polymerization and to increase the molecular weight of the polymer.

2. The method of claim 1 wherein said dialkyldiallyl ammonium compound is a dialkydiallyl ammonium halide.

3. The method of claim 1 wherein said dialkyldiallyl ammonium halide is a dimethyldiallyl ammonium halide.

4. The method of claim 1 wherein said dialkyldiallyl ammonium halide is dimethyldiallyl ammonium chloride.

5. The method of claim 1, 2, 3 or 4 wherein said polymerization is effected at a temperature of from about 30° to about 80° C.

6. The method of claim 1, 2, 3 or 4 wherein said polymerization is effected in the substantial absence of oxygen.

7. The method of claim 1, 2, 3 or 4 wherein said polymerization is effected in an aqueous reaction medium containing from about 10% to about 70%, by weight, of the monomer.

* * * * *